April 1, 1969  A. D. BORONKAY  3,436,541
COMPENSATED PARABOLIC NETWORK FOR PROVIDING 100 ADJUSTMENT
IN A RECORDING RADIANT ENERGY ANALYZER
Filed June 16, 1967
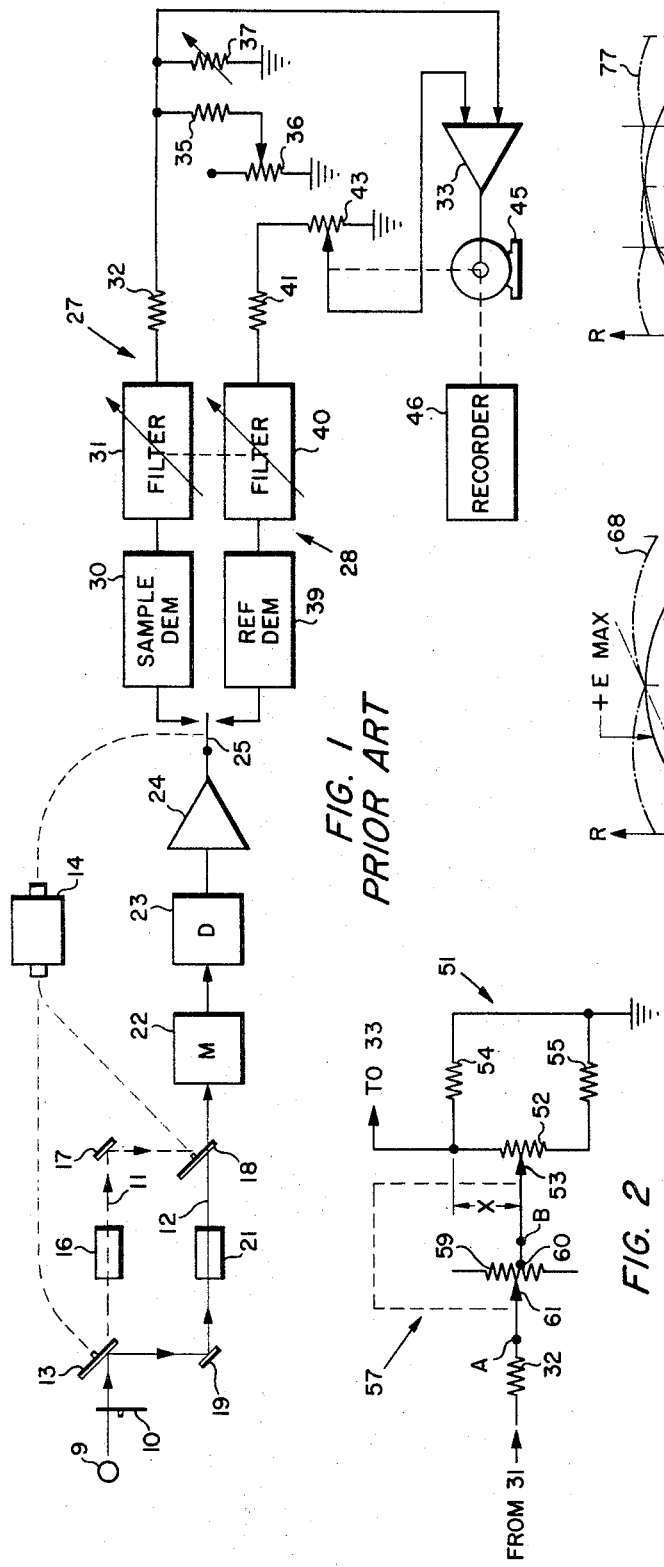
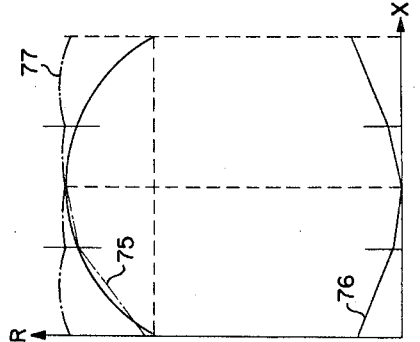
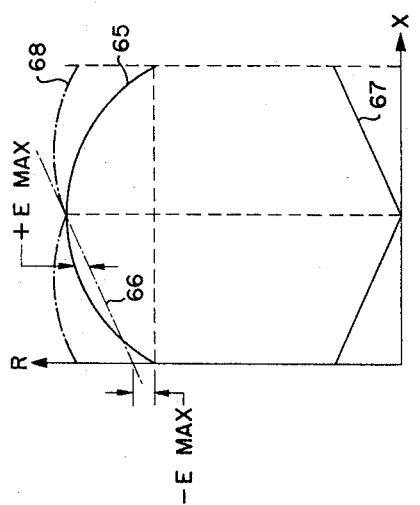
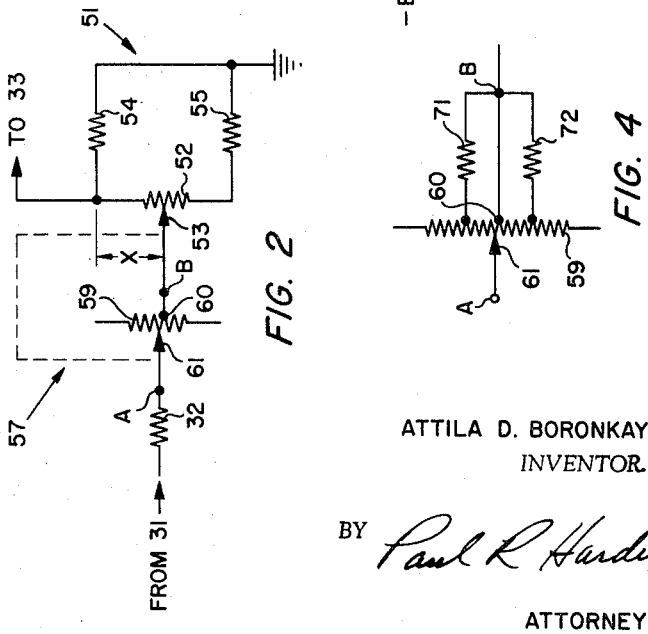
ATTILA D. BORONKAY
INVENTOR.
BY Paul R. Harder
ATTORNEY United States Patent Office 3,436,541
Patented Apr. 1, 1969

3,436,541
COMPENSATED PARABOLIC NETWORK FOR
PROVIDING 100% ADJUSTMENT IN A
RECORDING RADIANT ENERGY ANALYZER
Attila D. Boronkay, La Habra, Calif., assignor to
Beckman Instruments, Inc., a corporation of
California
Filed June 16, 1967, Ser. No. 646,592
Int. Cl. G01t 1/16; G01r 17/02
U.S. Cl. 250—83.3                    5 Claims

ABSTRACT OF THE DISCLOSURE

A ratio recording radiant energy analyzer is disclosed having a new and improved 100% adjustment for the recorder. A resistance network having a parabolic resistance as a function of the position of a slide wire is disclosed. A tapped potentiometer has its slider connected to receive the sample signal and its tap connected to the slider of the parabolic resistance network. The other side of the resistance network is connected to circuit ground. The parabolic resistance network is connected to the ratioing circuit.

Disclosure

This invention relates to radiant energy analyzers and more particularly to analyzers of the ratio recording type in which there is provided a new and improved 100% adjustment for the recorder covering a wide range in such a manner that the total resistance change is negligible.

In radiant energy analyzers of the ratio recording type it is the general practice to provide a recorder for the purpose of providing a permanent record of sample transmittance. A 100% adjustment is provided in the system such that the recorder pen may be adjusted to the 100% line in the absence of a sample. This adjustment sometimes must cover a dynamic range as large as 3:1 of signal values. The circuit in which this 100% control is accomplished is normally part of the period control network. This adjustment is desirably made in such a way that the total resistance change is negligible, since, as a part of the period control network, any change in its resistance results in a change in the time constant which affects the time-period balance between the reference and sample channels of the ratio circuit. This unbalance leads to errors in the recorded spectrum as a function of scanning speed.

It is therefore a principal object of this invention to provide a new and improved radiant energy analyzer in which adjustment of the 100% control of the recorder does not appreciably affect the time constant within the sample channel.

A further object of the invention is to provide a new and improved ratio recording radiant energy analyzer in which 100% recorder control adjustment may be accomplished without introducing any appreciable error in the recorded spectrum over a wide range of scanning speeds.

Further objects of the present invention and many of the attendant advantages thereof will be better understood by reference to the following detailed description when considered in connection with the accompanying drawing in which:

FIG. 1 illustrates a typical prior art ratio recorder having 100% line adjustment for the recorder;

FIG. 2 illustrates a constant impedance attenuator for use as the 100% adjustment control in the radiant energy analyzer of FIG. 1;

FIG. 4 illustrates an alternative embodiment of the constant impedance attenuator; and FIGS. 3 and 5 are various resistance curves illustrating the principles of operation of the attenuators of FIGS. 2 and 4.

Referring now to FIG. 1, there is illustrated a typical prior art ratio recording radiant energy analyzer in which radiation from any suitable source 9 after modulation by chopper 10, is alternately switched between a reference beam path 11 and a sample beam path 12 by a rotating beam splitter 13 driven at any suitable speed by motor 14. Radiant energy passing the reference cell 16 is directed by fixed mirror 17 to a beam recombiner 18 and energy in the sample path is directed by fixed mirror 19 through a sample cell 21 to beam recombiner 18. The beam recombiner 18 is driven in synchronism with beam splitter 13 by motor 14. The energy in the common path from beam recombiner 18 is directed to the entrance slit of a monochromator 22 for dispersion and scanning in a manner well known in the art. Energy from the exit slit of monochromator 22 is focused upon a radiant energy detector 23 which provides an electrical signal output that is a function of the instantaneous incident radiant energy. The beam splitter 13 and beam recombiner 18 may be provided with alternate reflecting and transparent sectors such that radiation passing the reference and sample cells alternately impinge upon detector 22. The chopper 10 may be constructed of alternate open and opaque sectors and driven at any suitable speed to provide chopped radiation at any suitable frequency, for example 400 Hz. The output of the detector is therefore an electrical A.C. signal having alternate reference and sample pulses whose amplitudes are proportional to the intensity of the radiation in the reference and sample beam paths.

The output of detector 23 is connected to an A.C. amplifier 24 having its output connected to a commutator or signal sorting switch 25 driven in synchronism with the beam splitting and recombining mirrors 13 and 18 by motor 14. The commutator 25 directs the sample pulse or signal to the sample channel generally indicated by the reference numeral 27 and the reference pulse or signal to the reference channel generally indicated by the numeral 28.

The sample signal is passed through demodulator 30 which provides at its output a D.C. signal having an amplitude proportional to the intensity of the radiation passing the sample cell. This D.C. signal is passed by a filter network 31 having a variable RC time constant and its output connected through resistor 32 to one input of a differential servo amplifier 33. Connected across the output of filter 31 through resistance 35 is a potentiometer 36 having one side connected to a suitable source of negative potential and the other side to ground. The potentiometer 36 serves as a zero adjustment for the recorder. Also connected across the output of filter 31 is a variable resistance 37 which serves to provide a 100% line adjustment at the recorder.

In the reference channel the reference signal passes demodulator 39, variable filter network 40 and resistor 41 and provides across potentiometer 43 a D.C. signal having an amplitude proportional to the intensity of the radiation passing the reference cell. The slide wire of potentiometer 43 is connected to the other input of differential amplifier 33 which has its output connected to the pen drive motor 45 of recorder 46. Potentiometer 43 may constitute the pen position follow-up potentiometer having its slider driven by pen motor 45.

As is well known in the art with the system of FIG. 1 the output of the pen drive motor is proportional to the ratio of the intensity of the sample beam to the intensity of the reference beam, i.e., sample transmittance. If the chart paper of recorder 46 is driven in synchronism with the scanning mechanism of monochromator 22 the trace of the recorder is a record of the sample transmittance as a function of wavelength. Filters 31 and 40 provide an adjustable RC time constant in the reference and sample channels for controlling the response of the ratioing circuit. The selector switches of the filters are mechanically coupled to provide a like time constant in each of the reference and sample signal channels. It is obvious that variable resistance 37 enters any consideration of the RC time constant in the sample channel and any change in this resistance results in a change in the RC time constant of the sample channel. Adjustment of the 100% line control thus results in a variation in the time constants between the reference and sample channels. This unbalance leads to a percent transmittance error in the recorded spectrum.

Referring now to FIG. 2 there is illustrated an improved constant impedance attenuator which may be utilized to attenuate the output of the sample channel while maintaining a substantially constant input impedance. The attenuator comprises a first resistance network 51 composed of potentiometer 52 having a slider 53 with resistors 54 and 55 having respectively one end thereof connected to opposite ends of potentiometer 52 and the other end connected together and to circuit ground. A second or compensating resistance 57 is provided which, in its simplest form, may be a potentiometer 59 having a tap 60 intermediate its ends and a slider 61. The slider 61 is connected to receive the sample signal from filter network 31 through fixed resistor 32 and tap 60 is connected to slider 53 of potentiometer 52. One end of potentiometer 52 is connected to differential amplifier 33, and in the embodiment illustrated the junction of potentiometer 52 and resistor 54 is utilized for this connection. Sliders 53 and 61 are mechanically coupled for synchronous movement.

It can be shown that the composite impedance of network 51 from slider 53 (or point B) to circuit ground is a parabolic function of the position $x$ of slider 53 on potentiometer 52 when the resistances 54 and 55 are equal. The composite impedance of the network from B to ground is:

$$R_B = R_{52} \frac{-x^2 + x + (k^2 + k)}{2k + 1}$$

where $$k = \frac{R_{54}}{R_{52}}$$

and $$R_{54} = R_{55}$$

Referring now to FIG. 3 wherein resistance is plotted as a function of $x$, the position of slider 53, curve 65 illustrates the impedance $R_B$ as a function of $x$ between the limits of potentiometer 52. Line 66 represents the best straight line correction for the parabolic function of $R_B$ with a maximum error of $\pm E$. The resistance of center tapped potentiometer 59 is chosen to compensate $R_B$ to a minimum error and a curve 67 represents the resistance between points A and B as a function of $x$. The composite resistance of the two networks or the resistance at point A with respect to ground is illustrated by curve 68. In one practical embodiment of the circuit of FIG. 2 the crest of the parabola $$\left[ \frac{R_B \text{ max.} - R_B \text{ min.}}{R_B \text{ min.}} \right]$$

is about 10% and the residual error is less than 1%. From curve 68 it is apparent that any change in the position of slider 53 does not result in any appreciable change in the total impedance to ground and therefore the RC time constant of the sample channel is unaffected even though the signal to the differential amplifier is reduced.

The residual error may be further decreased by adding taps to potentiometer 59 and shunting sections of the potentiometer by fixed resistances. For example, in FIG. 4 two additional taps are added to potentiometer 59 and shunting resistances 71 and 72 are connected between these taps and tap 60. FIG. 5 represents the principle of correction with two additional taps and shunting resistances. Curve 75 represents the best approximation utilizing two additional taps, curve 76 the resistance between points A and B and curve 77 the composite resistance from point A to ground.

It is apparent that additional taps and shunting resistances may be utilized depending upon the degree of correction desired. Alternatively, to provide an exact correction potentiometer 59 may be wound to have a parabolic function exactly complementary to the function of $R_B$. However, to provide a non-linearly wound potentiometer with a parabolic function is difficult and expensive. It should be noted, however, that in each case the impedance of network 57 is an approximation of the complement of $R_B$.

Obviously many modifications and variations of the present invention are possible in light of the above teachings and it is to be understood that within the scope of the appended claims the invention may be practiced otherwise than as specifically described.

What is claimed is:

1. In a radiant energy analyzer of the ratio recording type having reference and sample signal channels each including a period control network and recording servo means connected to said signal channels for indicating the ratio of the signal in said sample channel to the signal in said reference channel, the improvement comprising:

a first resistance network having an impedance control element, the resistance of said network being a parabolic function of the position of said impedance control element;

a second resistance means connected to said resistance network and having an impedance control element, means coupling said impedance control elements for synchronous operation, the impedance of said second resistance element being an approximate complement of the first resistance network impedance as a function of said first impedance control element whereby the total impedance variation across said networks as a function of the position of said control element is reduced;

means connecting said first and second networks across said sample channel; and means connecting said first resistance network to said recording servo means.

2. In a radiant energy analyzer of the ratio recording type having reference and sample signal channels each including a period control network and recording servo means connected to said signal channels for indicating the ratio of the signal in said sample channel to the signal in said reference channel, the improvement comprising:

a resistance network including a first potentiometer having a slider movable with respect to one end thereof, the resistance across said network being a parabolic function of the position of said slider with respect to said one end;

a second potentiometer having at least one tap located thereon intermediate the ends thereof and a slider, the sliders of said first and second potentiometer being coupled for synchronous movement and means connecting said tap to the slider on said first potentiometer;

means connecting said slider on said second potentiometer to said sample channel for receiving said sample signal; and means connecting said one end of said first slider to said recording servo means.

3. The radiant energy analyzer of claim 2 wherein said second potentiometer is linear.

4. The radiant energy analyzer of claim 2 wherein said second potentiometer includes at least two additional taps, one on each side of said one tap and a shunting resistor connected between each of said additional taps and said one tap.

5. In a radiant energy analyzer of the ratio recording type having reference and sample signal channels each including a period control network and recording servo means connected to said signal channels for indicating the ratio of the signal in said sample channel to the signal in said reference channel, the improvement comprising:
- a first potentiometer having at least one tap intermediate the end thereof and a slider connected to receive said sample signal;
- a second potentiometer having a slider mechanically coupled to the slider on said first potentiometer and substantially equal resistors connected respectively between the ends of said potentiometer and circuit ground, the slider of said second potentiometer being connected to said tap; and
- means connecting one end of said second potentiometer to said recording servo means.

References Cited
UNITED STATES PATENTS 3,312,897  4/1967  Fingerett _____ 324—98

RALPH G. NILSON, *Primary Examiner.*

M. J. FROME, *Assistant Examiner.*

U.S. Cl. X.R.

333—81, 244; 397—98